United States Patent
Call et al.

(10) Patent No.: US 7,069,588 B2
(45) Date of Patent: Jun. 27, 2006

(54) SYSTEM AND METHOD FOR PROTECTING COMPUTER DEVICE AGAINST OVERLOAD VIA NETWORK ATTACK

(75) Inventors: R Christian Call, Aberdeen, NJ (US); David J Cavuto, Edison, NJ (US); Tadesse W Giorgis, Neptune, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 919 days.

(21) Appl. No.: 09/941,981

(22) Filed: Aug. 29, 2001

(65) Prior Publication Data

US 2003/0046581 A1 Mar. 6, 2003

(51) Int. Cl.
*G06F 11/00* (2006.01)
*G06F 11/30* (2006.01)

(52) U.S. Cl. .................. 726/22; 726/23; 713/189; 713/190; 713/192; 713/194

(58) Field of Classification Search ............... 713/201, 713/160, 153, 164, 189, 194, 190, 192; 709/224, 709/246; 726/22, 23
See application file for complete search history.

(56) References Cited

U.S. PATENT DOCUMENTS

2002/0065938 A1* 5/2002 Jungck et al. ............ 709/246
2003/0110396 A1* 6/2003 Lewis et al. ............. 713/201

* cited by examiner

*Primary Examiner*—Matthew Smithers
*Assistant Examiner*—Courtney Fields

(57) ABSTRACT

The present invention protects network devices from overload and from network packet flood attacks (such as Denial of Service and Distributed Denial of Service attacks) that would otherwise consume available resources, and possibly cause system failure or compromise the system by allowing intrusion. The invention, termed an intelligent cache management system is used to free allocated resources (memory, in particular) for reuse, when under sustained attack. One exemplary embodiment of a cache management system of the present invention is used in connection with session-type packet processing devices of a computer network. The system comprises a memory management database for storing communication traffic classification and memory threshold values, and a memory monitor for tracking overall memory usage and determining when the memory threshold values stored in the memory management database are reached. A cache classifier is used to determine a class into which a given session of communications traffic falls. When the memory threshold value is reached, a pruning mechanism selects and prunes entries representing sessions on the packet processing device in accordance with the communication traffic classification and memory thresholds programmed in the memory management database.

30 Claims, 3 Drawing Sheets

Memory versus time for a system configured to use ICM.

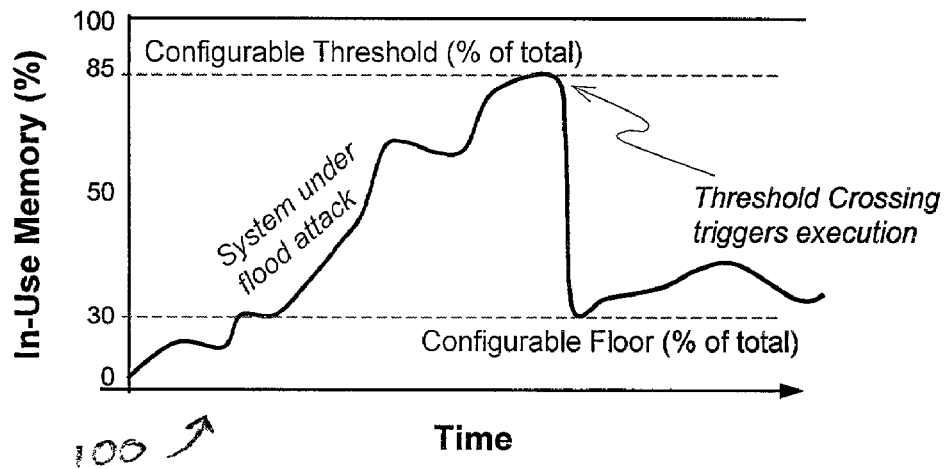
*Figure 1. Memory versus time for a system configured to use ICM.*
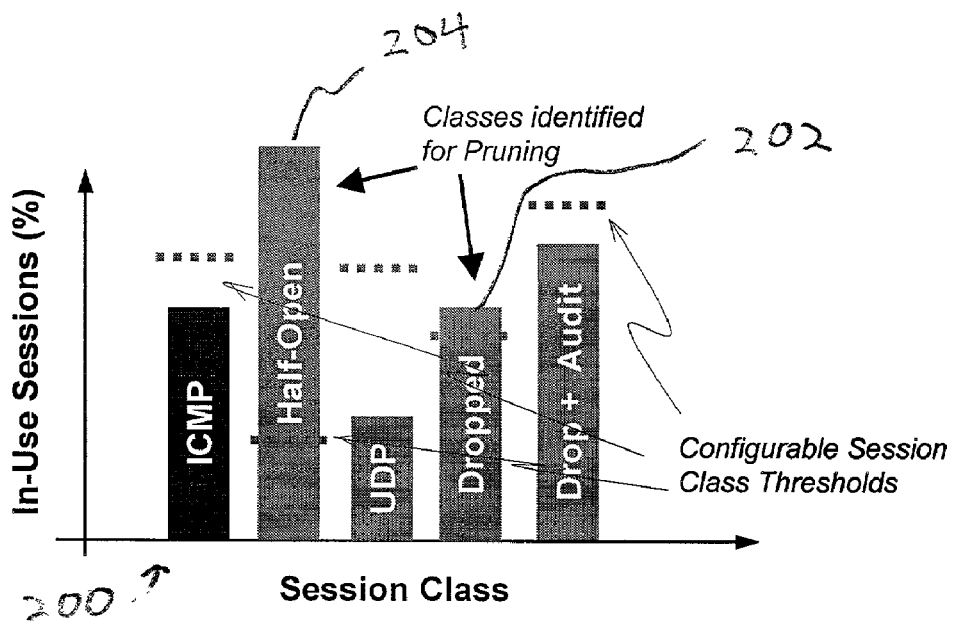
*Figure 2. Cache classes sample utilization and configurable threshold. Note that Dropped and Half-open sessions are both above their own thresholds, and therefore subject to pruning.*

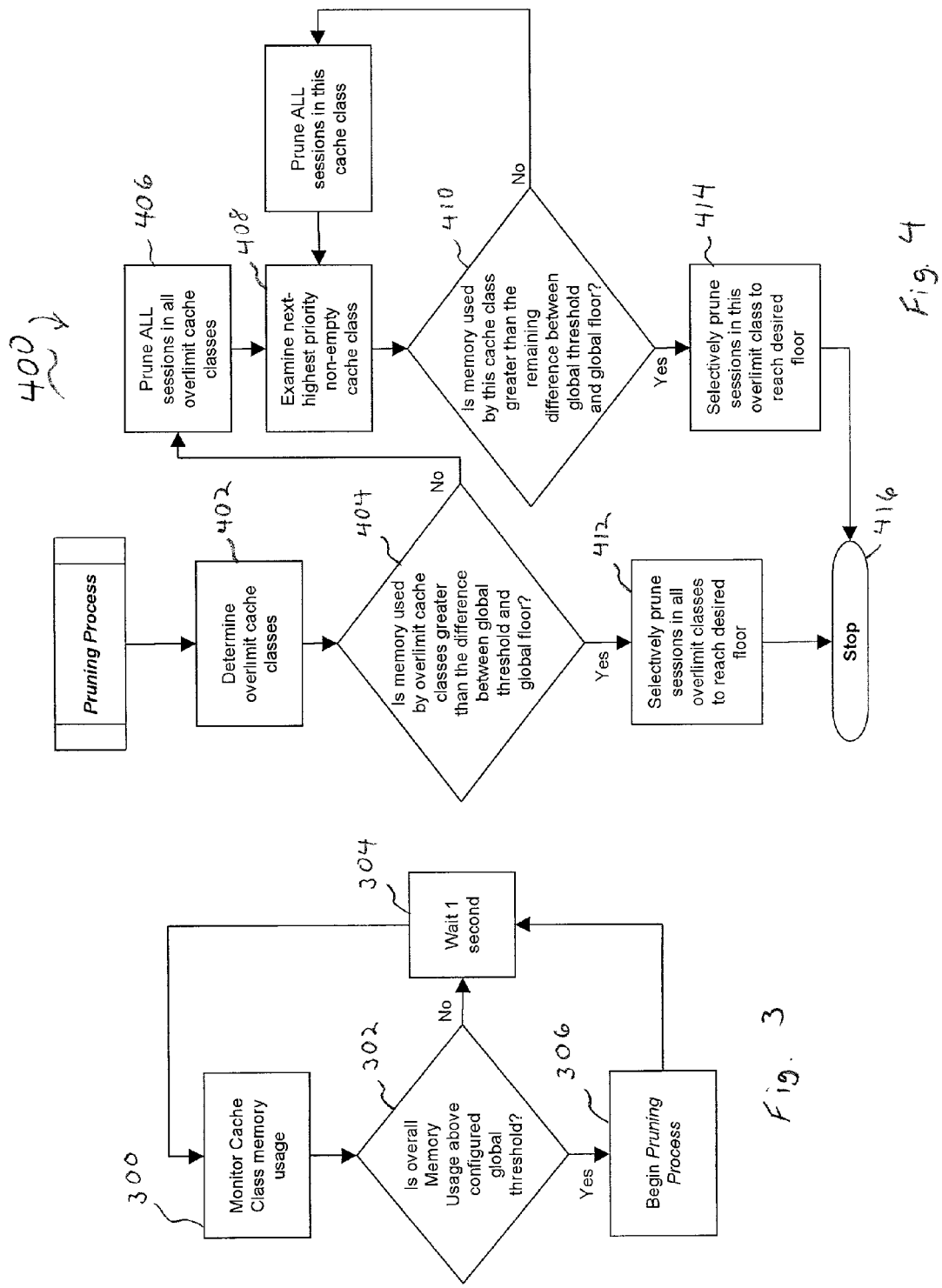

SYSTEM AND METHOD FOR PROTECTING COMPUTER DEVICE AGAINST OVERLOAD VIA NETWORK ATTACK

FIELD OF THE INVENTION

The present invention relates generally to the field of Computer Network Security.

BACKGROUND OF THE INVENTION

When two devices on a computer network communicate with each other, they typically do so by creating a connection between them. That connection is identified by the protocol used for communication, and the addresses and ports used by each endpoint. Once a connection has been established, the two endpoints may exchange many data packets. The connection and the packets that are sent in that connection are referred to as a "session."

Some devices (for example, simple routers) that process traffic on computer networks make packet-by-packet decisions about how to handle network traffic. A set of rules is applied to each packet received by the device, and the packet is then handled accordingly. The rules are applied without regard to what other packets within a session may previously have been processed. Such devices are called "non-stateful" devices, because they handle traffic without regard to the state of the session.

So-called "stateful" devices, on the other hand, operate under the assumption that there will be many packets for each session. They maintain state information about the sessions that they process, thus allowing traffic in established sessions to be processed quickly.

Maintaining state information requires that stateful device allocate resources dedicated to storing that information. One form of attack against a stateful device (as explained below) involves creating false sessions, and by doing so inducing that device to maintain information about those sessions, to the extent that the device no longer has enough resources to process legitimate network traffic.

A stateful device that is aware of the semantics of connection-oriented services, like TCP (transmission control protocol), makes a decision at connection setup time, and then forwards messages more efficiently for subsequent packets in that connection. Finally, when the service semantics indicate that the session is complete, the device stops forwarding packets for that session.

Most packet-filtering firewalls, as well as other devices like Layer-4 switches, make decisions based on the concept of a "session". The concept of a session is well defined for TCP, since the TCP protocol specifies the point in the message-passing where a connection has been established. For other protocols, such as UDP or ICMP, the concept of a "session" is artificial to some extent, and must be inferred by the relative frequency and direction of packets.

In any case, since a session is a transient concept, network devices must allocate resources, usually amounting to RAM and CPU cycles, to keep track of it. For TCP or UDP, the possible number of sessions at any one time is bounded by the number of modifiable bits in the IP and TCP/UDP headers. IP provides 32 bits of source and destination address information along with 8 bits of protocol information. If the protocol is TCP (6) or UDP (17), they provide an additional 16 bits each of source and destination port information. This totals (32+32+16+16=96 bits or 12 bytes) of possible session permutation information, just for TCP or UDP alone. The universe of possible unique session permutations is therefore on the order of $2^{97}$ or about $10^{29}$ (100,000,000,000,000,000,000,000,000,000 sessions)!

Even if each session took a single byte of RAM in the device, and a single clock cycle to process, keeping track of this many sessions is completely infeasible with today's technology. As a result, there must exist a limit to the number of sessions that any one device can track at a given time. Correspondingly, that device must have a strategy as to how to deal with being offered more sessions than it can track at a given time.

As an example, assume a device can support 10,000 simultaneous sessions. The smallest size of an IP packet containing a UDP segment is 32 bytes or 256 bits (ignoring L2 framing). Over a 56 kilobit/second line (e.g. a modem), a potential attacker could generate 10,000 unique sessions in about 45 seconds. Over a T-1 connection (1.544 Mbps), this same attack would take less than 2 seconds. This action would completely shut down the device until it could remove these sessions from its list of active sessions (usually by idle timeout or other cleanup mechanism).

Such attacks are trivial to generate; many tools exist for generating such traffic and are available for public download today. Distributed Denial-of-Service tools are the latest generation of such tools, where one controller can issue commands to many "zombie" processes which live on compromised systems to coordinate a massive attack at literally the touch of a button. Note however that DDoS attacks are only different from conventional DoS attacks in scale, and that the attack can come from many physical endpoints simultaneously.

The simplest action to take when all available cache memory is used is to ignore new sessions. The difficulty with that strategy is that while it allows existing users to continue working, it prevents new users from accessing protected resources (servers, etc.).

A different strategy is to simply clear existing sessions from the device's memory, and place new sessions in the newly-freed space. That strategy has the drawback that removing existing sessions arbitrarily may interrupt the flow of traffic for valid sessions. It may not be possible to resume or recover those sessions easily (for example, an FTP download that has been running for thirty minutes might have to be started all over again). Thus, it is desirable to have a more efficient methodology to determine which sessions are expendable.

SUMMARY OF THE INVENTION

The present invention protects network devices from network packet flood attacks that would otherwise consume available resources, and possibly cause system failure or compromise the system by allowing intrusion. The invention, termed an "intelligent cache management system," is used to free allocated resources (memory, in particular) for reuse when a device is under sustained attack. One exemplary embodiment of an intelligent cache management system of the present invention is used in connection with session-type packet processing devices of a computer network. The system comprises a memory management database for storing communication traffic classification and memory threshold values, and a memory monitor for tracking overall memory usage and determining when the memory threshold values stored in the memory management database are reached. A cache classifier is used to determine a class into which a given session of communications traffic falls. When the memory threshold value is reached, a pruning mechanism selects and prunes session cache entries on the packet processing device according to the traffic classification and memory thresholds programmed in the memory management database.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 1 is an illustration of memory versus time for an exemplary system configured using the cache management system of the present invention;

FIG. 2 is an illustration of cache classes and exemplary configurable thresholds for an exemplary cache management system of the present invention;

FIG. 3 is an exemplary flow diagram for the memory monitoring process according to the present invention;

FIG. 4 is an exemplary flow diagram for the pruning process according to the present invention.

DETAILED DESCRIPTION

Figure 5:
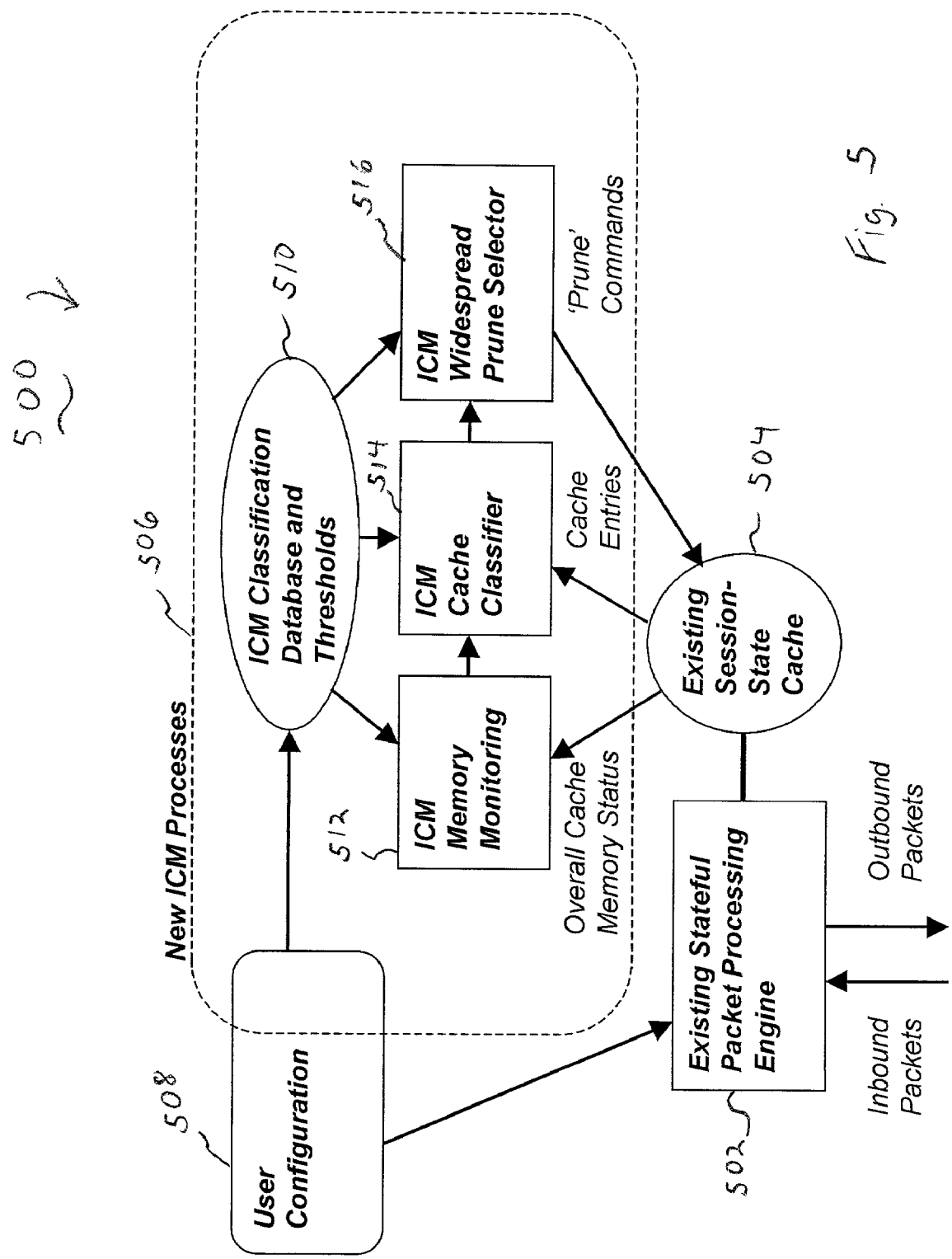
FIG. 5 is an exemplary functional block diagram for a cache management system of the present invention.

Although the present invention is described in connection with a firewall for a computer network, it would be understood that the invention may also be used with other packet processing/computing devices like routers, switches and hosts. An exemplary firewall of the type in which the present invention may be implemented contains a cache of all currently-active sessions in a large block of RAM. This cache is tracked by unique identifiers for each session, including source and destination addresses and source and destination ports. Any session processed by the firewall, regardless of whether it is passed or dropped, is entered into that cache, for performance reasons.

When a new packet arrives at the firewall, it is compared against the existing session cache entries to see whether there exists a cache entry matching that packet. If so, the packet is immediately processed (passed, dropped, and so forth) as indicated in the session cache entry. That processing can be done very efficiently, providing an extremely low-latency path through the firewall. If no matching cache entry exists, the packet is processed by sequentially comparing it to rules in each of several zones, for example, (possibly generating a cache entry for each zone) to determine what should be done with it.

Current firewalls or portions of firewalls support extremely large session caches. The Brick Model 201 developed by Lucent Technologies of Murray Hill, N.J., for example, supports 100,000 cache entries in its session cache. As noted above, however, it is trivial for an attacker to generate an attack that will fill up even 100,000 cache entries—especially if the attacker has compromised a system with a high-bandwidth connection to the Internet, or can control many systems for use in a Distributed DoS attack.

The present invention is an intelligent cache management system, and related methodology, for a firewall-type device which acts to "prune" sessions from a session cache, when necessary, in a manner that will have the least possible impact on end users.

The present invention is advantageous in that it activates the pruning mechanism only when it is reasonable to conclude that an attack is in progress. That is done by allowing a firewall administrator to configure the system so that it begins to prune sessions only when the cache memory used exceeds an anticipated level. The level, called a "global ceiling value" represents a percentage of total cache memory; it indicates the point at which the feature should activate. An exemplary default value is 85%.

The invention is also advantageous in that it limits how much memory the pruning mechanism will free, thus ensuring that sufficient resources will be freed while also limiting the number of session cache entries that will be discarded. That is accomplished by allowing the administrator to set a global floor value, representing a percentage of total cache memory on the firewall. The floor value indicates the desired amount cache memory that should remain in use after the feature executes. An exemplary default value is 60%.

The invention is also advantageous in that it provides the ability to apply protection where it is most likely to be needed. This is done by allowing the administrator to identify anticipated usage levels for particular classes of traffic, and by first pruning cache entries for those classes when they have exceeded the anticipated thresholds. Thus, the session cache entries targeted for pruning are those most likely to represent sessions created by an attacker.

The invention is also advantageous in that it provides the ability to prioritize certain types of traffic for pruning, thereby allowing pruning to proceed in the least disruptive way possible in the event that the pruning mechanism must discard cache entries for sessions that are not likely to be part of an attack. This is done by allowing the administrator to place the defined classes of traffic in a priority order. The classes at the top of the list will be considered first for pruning.

The invention is also advantageous in that it provides for the deletion of a fractional number of cache entries from a given class without requiring the use of floating-point operations in the computation and tracking of those fractions.

The classes of traffic are defined using certain criteria, for example, as follows: auditing level applied to the session (Any, None, Basic, or Detailed); action criteria (Any, Pass, Drop, Proxy, or VPN); service criteria (Any, or a combination of protocol and ports); and whether the session is a half-open TCP session.

These criteria allow very fine granularity in prioritizing sessions for deletion. In an exemplary embodiment of the present invention, specific traffic classes are assigned the following order of priority: (1) Dropped and Unaudited sessions; (2) Dropped and Audited sessions; (3) ICMP sessions; (4) UDP sessions; and (5) Half-open TCP sessions.

Each one of these criteria may be assigned a given a percentage, for example, which defines a threshold amount of "expected" traffic of this type at any point in time. It should be noted that the relative order of these five traffic classes is adjustable.

The basic operation of the cache management system of the present invention, also termed the Intelligent Cache Management (ICM) system is as follows (referring to FIG. 1, a chart 100 of in-use memory vs. time is shown for an exemplary cache management system): As shown, the system is configured with threshold floor and ceiling thresholds of 30 percent and 85 percent available memory of the system. Once the global memory usage exceeds the ceiling, sessions are selected for pruning from the cache. Sessions are then pruned until either the floor is reached, or all sessions in the configured cache classes have been pruned. Once sessions have been identified for pruning, the brick processes its list of session cache entries and removes entries accordingly. Since it has already been determined which entries are to be discarded and which are not, only one pass through the list of cache entries is required.

The effect of pruning a session is fairly minimal to the user. This is because the session is simply removed from the firewall's memory, where the session can be reestablished if new traffic is sent by the original source. Also note that fully-open TCP connections are never pruned, thereby eliminating the possibility of disturbing a valid, established TCP session.

As discussed, FIG. 1 illustrates a system that has been configured to have a ceiling of 85% and a floor of 30%. The flood executes until the system reaches the ceiling, and then the ICM feature becomes active. Once ICM executes, it must examine each cache class to see which, if any, classes are above the configured thresholds.

Referring to, a bar graph 200 of exemplary cache classes for the system of FIG. 1 is shown. As can be seen, only Dropped and Half-Open classes 202, 204 are above their own thresholds. The ICM invention will first consider pruning Dropped and Half-Open sessions to get to the desired floor value. If the ICM determines that even by pruning all above-threshold sessions, the desired floor can't be achieved, it will prune all of the above-threshold sessions, and selectively prune the remaining cache class sessions to achieve the floor.

FIG. 3 shows the basic methodology used by the ICM to monitor cache memory usage (step 300). At step 302, the system checks whether the overall memory usage is above the configured threshold. If, not, the ICM waits a given amount of time (step 304) and then it determines the overall memory usage again. If the memory usage is above the global threshold, then the pruning process begins (step 306).

FIG. 4 shows a flow diagram 400 of the basic ICM pruning process according to the present invention. Sessions within cache classes are selected for pruning by examining an ordered list of cache classes. The list consists first of those classes whose memory usage exceeds their threshold (step 402), in the order in which those classes appear on the configured list of cache classes; and then of those with usage below their threshold, in the order in which they appear on the configured list. The classes in that list are then examined, one at a time at step 404. If removing all of the entries in a particular class would not bring total memory usage below the floor value, all entries in that class are selected for pruning (step 406), and the process continues (steps 408, 410). On the other hand, if the floor can be reached by pruning only some fraction of the entries in that class—termed "selective pruning"—then that fraction of entries is identified for pruning (steps 412, 414), and the process stops (step 416). The classes are examined until either it is determined that the floor value can be reached, or all entries within the defined cache classes have been selected for pruning.

When removing entries for a cache class for which a fractional number of entries must be removed (selective pruning) the ICM uses an algorithm that is both efficient and evenly distributive in its selection of entries to be pruned. Given some number b out of a total number of bytes t that must be freed, the brick approximates bit by dropping one low-order bit from both the numerator and denominator until either the numerator is reduced to 1 or the denominator becomes less than 256. As the brick examines the list of cache entries, it frees the first b out of every t entries in the given cache class. This is efficient because it avoids the use of floating-point arithmetic in determining when bit bytes have been freed. It is also well-distributed in the way it frees entries: The cache entries appear on the list in the order in which they were created, and thus the method of discarding entries is not biased toward the most- or least-recently created entries FIG. 5 shows a functional block diagram for the ICM system 500 of the present invention as it would be added to an existing packet processing system. As can be seen, the ICM system 500 works in connection with an existing stateful packet processing engine 502 which receives and transmits the inbound and outbound packets. The processing engine 502 couples to the session state cache 504 which in turn couple or connect to the new ICM processes 506. A user configuration module 508 is coupled to the ICM processes 506 and is used to configure the ICM class definitions and the ICM thresholds, which are stored in an ICM classification and thresholds database 510.

The basic processes used by the ICM system include an ICM memory monitoring module 512, an ICM cache classifier 514 and an ICM widespread prune selector 516. The memory monitoring module 512 tracks overall cache memory usage. The cache classifier 514 tracks memory usage of each configured cache class and the prune selector 516 determines the sessions in the cache to purge, when necessary. As discussed, an implementation of ICM must choose a set of criteria to use for configuring the ICM cache classes. The cache classifier is used to determine the class (or "category") into which a given session falls. The criteria by which the classifier makes this decision is implementation-specific, but some common criteria can be suggested for TCP/IP-based sessions. As an example, for OSI Layer 3 Information, one or more of the following may used for determining class: Source IP Address or Range, Destination IP Address or Range and IP Protocol (e.g. 6 for TCP, 17 for UDP). For OSI Layer 4 Information, TCP/UDP Source Port or Range, TCP/UDP Destination Port or Range (usually determines the server "application") and whether or not the session is "fully-open" as defined by TCP state transitions can be used. For Application-Specific Information, whether or not the session is audited (i.e. "logged"), and to what degree of detail, whether the session is allowed or blocked (i.e. "passed" or "dropped") and other application-specific information can be used to determine class.

It may also be desirable to allow wildcards in the definition of a cache class, to ensure that all desired sessions of a given type are matched. It may also be desirable to allow "Don't Care" specifications, so the criteria space may be segmented using any subset of the supplied criteria, ignoring certain other criteria.

In lab testing of the present invention, a SmartBits traffic generator was used to generate UDP packets with random source addresses and ports (in effect, each packet represented the start of a new session, from the brick's perspective). In parallel, HTTP and FTP clients and servers were set up through the same Brick to simulate valid user traffic.

Under test, 10,000 new sessions per second were generated by the SmartBits generator. With the ICM invention turned off, all new FTP and HTTP sessions failed after 10 seconds of test. With ICM turned on, most new FTP and HTTP sessions were able to complete and fetch the requested resource. This process was continued for 24 hours with no additional degradation of user session performance.

ICM is designed to allow the firewall to continue processing traffic under massive denial of service attacks. Tunable parameters help the firewall administrator adjust the pruning thresholds more precisely to distinguish an attack from actual user traffic. ICM allows the firewall to continue to operate and process user traffic, even when flooded with extreme volumes of traffic. A significant advantage of the present invention is that it can be used in any stateful network entity to help it determine how to efficiently and effectively free resources that have been consumed by an attack.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method for use with a stateful packet processing device of a computer network for mitigating effects of a network overload against said device, said method operable to free memory used to store information about communications sessions managed by said device, said method comprising the steps of:
   classifying session cache entries made in memory into different cache classes, according to one or more characteristics of those entries;
   determining when said device is under network overload;
   selecting session cache entries for deletion and deleting them thereby freeing associated memory when said device is under network overload;
   determining when sufficient memory has been freed, such that said cache entries are no longer deleted.

2. The method of claim 1, wherein said characteristics for said step of classifying are selected from the group consisting of: whether the session is dropped by the device, whether the session is audited by the device, IP protocol of the session, ICMP type and code used in the session, TCP ports used in the session, UDP ports used in the session, and whether the session is a half-open TCP session.

3. The method of claim 1, wherein certain of said characteristics of the session may be identified as "any", wherein any session matches a particular criterion for classification.

4. The method of claim 1, wherein predefined cache classes are selected from the group consisting of:
   dropped and unaudited sessions, dropped and audited sessions, ICMP sessions, and half-open TCP sessions.

5. The method of claim 4, wherein the predefined cache classes are assigned a priority for deletion.

6. The method of claim 1, wherein the device is considered to be under network overload when the amount of memory used for session cache entries exceeds a configurable trigger threshold.

7. The method of claim 6, wherein a sufficient amount of memory has been freed when the amount of memory used for session cache entries falls below a configurable floor threshold.

8. The method of claim 4, wherein a memory usage threshold is configurable for each predefined cache class.

9. The method of claim 8, wherein said step of selecting and deleting includes the steps of:
   retrieving from a database the amount of memory used to store session cache entries for each cache class;
   recognizing each cache class whose memory usage exceeds an associated memory usage threshold;
   ordering each cache class according to its deletion priority;
   selecting for deletion according to said ordering step some fraction of entries of a given cache class if said deletion brings said total cache memory usage below said floor, wherein, otherwise, all entries of said given class are selected for deletion; and
   continuing said step of selecting for deletion until it is determined that either deleting all the entries selected for deletion would bring the total cache memory usage below the floor threshold, or all entries in all defined cache classes have been selected for deletion.

10. The method of claim 9, wherein said step of ordering includes ordering cache classes whose memory usage does not exceed said associated memory usage threshold.

11. The method of claim 9, wherein configuration data for the thresholds may be supplied in a normalized fashion and be adaptively applied to the device, depending on the amount of memory on the device.

12. An apparatus for use with a stateful packet processing device of a computer network for mitigating effects of a network overload against said device, said apparatus operable to free memory used to store information about communications sessions managed by said device, said system comprising:
   a classification component operable to determine, for each session cache entry, the cache class to which that entry belongs according to one or more characteristics of the entry;
   a memory management database for tracking the amounts of memory used for each category of entry, as well as for tracking the total amount of memory used for all entries;
   a pruning component that is used to select and delete entries; and
   a processor for determining when said device is experiencing network overload and selecting specific cache session entries for deletion until sufficient memory has been freed.

13. The apparatus of claim 12, wherein information kept in the memory management database is updated each time a new cache entry is created or deleted by the device.

14. The apparatus of claim 12, wherein said characteristics for said step of classifying are selected from the group consisting of: whether the session is dropped by the device, whether the session is audited by the device, IP protocol of the session, ICMP type and code used in the session, TCP ports used in the session, UDP ports used in the session, and whether the session is a half-open TCP session.

15. The apparatus of claim 14, wherein certain of said characteristics of the session may be identified as "any", wherein any session matches a particular criterion for classification.

16. The apparatus of claim 12, wherein predefined cache classes are selected from the group consisting of:
dropped and unaudited sessions, dropped and audited sessions, ICMP sessions, and half-open TCP sessions.

17. The apparatus of claim 16, wherein the predefined cache classes are assigned a priority for deletion.

18. The apparatus of claim 16, wherein a memory usage threshold is configurable for each predefined cache class.

19. The apparatus of claim 12, wherein the pruning mechanism selects entries for deletion by:
retrieving from a database the amount of memory used to store session cache entries for each cache class;
recognizing each cache class whose memory usage exceeds an associated memory usage threshold;
ordering each cache class according to its deletion priority;
selecting for deletion according to said ordering step some fraction of entries of a given cache class if said deletion brings said total cache memory usage below a floor threshold, wherein, otherwise, all entries of said given class are selected for deletion; and
continuing said step of selecting for deletion until it is determined that either deleting all the entries selected for deletion would bring the total cache memory usage below the floor threshold, or all entries in all defined cache classes have been selected for deletion.

20. The apparatus of claim 19, wherein said step of ordering includes cache classes whose memory usage does not exceed said associated memory usage threshold.

21. The apparatus of claim 19, wherein the pruning mechanism operates by making only one pass through a list of session cache entries in said device.

22. The apparatus of claim 12, wherein a trigger threshold and floor threshold corresponding to said total memory usage are adjustably configurable.

23. The system of claim 12, wherein the memory usage statistics are collected using the Simple Network Management Protocol (SNMP).

24. The apparatus of claim 12, wherein the pruning mechanism, when it has to delete some fraction of the entries in a given cache class, approximates the fraction b/t (where b is the total number of bytes of memory that must be freed and t is the total number of bytes of memory used to hold session cache entries for that cache class) with another fraction p/q, where p>=1 and q is likely to be small relative to the total number of cache entries in that class; and then frees p entries out of every q entries in that cache class on the list of session cache entries.

25. A cache management system used in connection with session-type packet processing devices of a computer network, said system comprising:
a memory management database for storing communication traffic classification and memory threshold values;
a memory monitor for tracking overall memory usage and determining when said memory threshold values stored in said memory management database are reached;
a cache classifier used to determine a class into which a given session of communications traffic falls; and
a pruner mechanism for selecting and pruning selected sessions of said packet processing device in accordance with said communication traffic classification and memory thresholds programmed in said memory management database when said memory threshold value is reached.

26. The system of claim 25 wherein said prune selector is operable to selectively prune sessions of an ordered overlimit class if the memory used by said class is greater than the difference between a global ceiling threshold and a global floor threshold.

27. The system of claim 26, wherein said prune selector is operable to prune all sessions of said overlimit class if the memory used by said class is less than the difference between said global ceiling threshold and said global floor threshold.

28. The system of claim 27, wherein a next highest priority class is examined to determine if memory used by said class is greater than a remaining difference between said global ceiling threshold and said global floor threshold, said next highest priority class being selectively pruned if said difference is greater than said remaining difference.

29. The system of claim 28, wherein said prune selector is operable to prune all sessions of said next highest priority class if the memory used by said class is less than said remaining difference.

30. The system of claim 25, wherein said devices are selected form the group consisting of: network firewalls, routers, switches and hosts.

* * * * *